United States Patent
Choi

(10) Patent No.: US 9,282,564 B2
(45) Date of Patent: Mar. 8, 2016

(54) SIMULTANEOUS TRANSMIT AND RECEIVE (STR) STRUCTURES IMMUNE TO PHASE AND AMPLITUDE IMBALANCES

(71) Applicant: Intel Corporation, Santa Clara, CA (US)

(72) Inventor: Yang-Seok Choi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 51 days.

(21) Appl. No.: 14/128,278

(22) PCT Filed: Sep. 18, 2013

(86) PCT No.: PCT/US2013/060445
§ 371 (c)(1),
(2) Date: Dec. 20, 2013

(87) PCT Pub. No.: WO2014/088676
PCT Pub. Date: Jun. 12, 2014

(65) Prior Publication Data
US 2015/0009867 A1 Jan. 8, 2015

Related U.S. Application Data

(60) Provisional application No. 61/734,323, filed on Dec. 6, 2012.

(51) Int. Cl.
*H04W 4/00* (2009.01)
*H04W 72/08* (2009.01)
(Continued)

(52) U.S. Cl.
CPC ............ *H04W 72/085* (2013.01); *H04B 7/015* (2013.01); *H04L 5/0048* (2013.01); *H04L 5/14* (2013.01);
(Continued)

(58) Field of Classification Search
CPC .......... H04B 7/015; H04B 3/20; H04B 7/155; H04B 7/005; H04M 9/08; H04W 52/02; H04W 72/085; H04W 72/082; H04W 76/023; H04W 76/046

USPC .......................................................... 370/278
See application file for complete search history.

(56) References Cited

U.S. PATENT DOCUMENTS

| 5,636,272 | A | 6/1997 | Rasmusson |
| 6,278,785 | B1 * | 8/2001 | Thomasson ..................... 381/66 |
| 2011/0019831 | A1 | 1/2011 | Liu |
| 2012/0269102 | A1 | 10/2012 | Nicholls et al. |

FOREIGN PATENT DOCUMENTS

| KR | 1020110025667 A | 3/2011 |
| WO | 2010077545 A1 | 7/2010 |

OTHER PUBLICATIONS

International Search Report and Written Opinion received for Patent Application No. PCT/US2013/060445, mailed on Feb. 7, 2014.
(Continued)

*Primary Examiner* — Sai-Ming Chan
(74) *Attorney, Agent, or Firm* — Alpine Technology Law Group LLC

(57) ABSTRACT

An echo-canceling unit for a simultaneous transmit and receive (STR) system includes at least three phase shifters instead of just two phase shifters in order to provide immunity to phase and/or amplitude imbalances. Each respective phase shifter is coupled to a transmit signal to generate an output signal comprising a selected phase shift with respect to the transmit signal. A weight calculation unit generates a corresponding amplitude-weight signal for the output signal of the phase shifter. A variable attenuator attenuates the output signal of each respective phase shifter based on the corresponding amplitude-weight signal to form an echo-cancelation signal component corresponding to the phase shifter. A first summer then sums the respective echo-cancelation signal components into a received signal containing an echo signal to form an echo-canceled signal. In some embodiments, an information handling system includes a receiver and a transmitter coupled to the echo-canceling unit.

18 Claims, 11 Drawing Sheets

(51) Int. Cl.
- H04W 56/00 (2009.01)
- H04W 48/08 (2009.01)
- H04L 29/08 (2006.01)
- H04B 7/015 (2006.01)
- H04L 5/14 (2006.01)
- H04L 5/00 (2006.01)
- H04W 72/04 (2009.01)
- H04W 76/02 (2009.01)
- H04W 76/04 (2009.01)

(52) U.S. Cl.
CPC ........... *H04L 67/1068* (2013.01); *H04W 48/08* (2013.01); *H04W 56/00* (2013.01); *H04W 72/0413* (2013.01); *H04W 72/082* (2013.01); *H04W 76/023* (2013.01); *H04W 76/046* (2013.01)

(56) References Cited

OTHER PUBLICATIONS

International Preliminary Report on Patentability received for International Patent Application No. PCT/US2013/060445, mailed on Jun. 9, 2015.

\* cited by examiner

US 9,282,564 B2

SIMULTANEOUS TRANSMIT AND RECEIVE (STR) STRUCTURES IMMUNE TO PHASE AND AMPLITUDE IMBALANCES

TECHNICAL FIELD

Embodiments described herein are generally directed to the field of wireless communications.

BACKGROUND

In order to cancel an echo signal caused by a transmitted signal and experienced by a receiver of a simultaneous transmit and receive (STR) system, one conventional approach for estimating the echo signal $x(t-\tau)$ has been to use a vector modulator having two phase shifters that arbitrarily rotates and two variable attenuators that arbitrarily scales $x(t)$. A transmitted signal $x(t)$ can be represented by an in-phase component and a quadrature-phase component as $$x(t)=x_i(t)\cos(\omega t)+x_q(t)\sin(\omega t) \qquad (1)$$

in which $\omega$ is the carrier frequency in rad/sec, $x_i(t)$ is the magnitude of the in-phase component as a function of time t, and $x_q(t)$ is the magnitude of the quadrature-phase component as a function of time t. FIG. 2 depicts an exemplary ideal estimated echo signal $\tilde{x}(t)$ that has been estimated by scaling and rotating $x(t)$ as $$\tilde{x}(t)=w_i x(t)+w_q \hat{x}(t) \qquad (2)$$

in which $\hat{x}(t)$ is the Hilbert transform of $x(t)$ (which is a 90-degree phase shift of $x(t)$), and $w_i$ and $w_q$ respectively are the weights for the in-phase and quadrature-phase components of $x(t)$. FIG. 2, in particular, depicts a vector representation of an ideal output of a conventional vector modulator.

Due to phase imbalances the phase shifters of a conventional vector modulator, however, $\hat{x}(t)$ is typically not orthogonal to $x(t)$. Additionally, amplitude imbalances of a conventional vector modulator cause $\hat{x}(t)$ to typically have a different power magnitude than $x(t)$. FIG. 3 depicts a vector representation of an exemplary output of a conventional vector modulator in which both phase and amplitude imbalances are present. As shown in FIG. 3, vector $\hat{x}(t)$ is not orthogonal to $x(t)$ so the vectors orthogonal to $x(t)$ or $\hat{x}(t)$ cannot be represented by a linear combination of $x(t)$ and $\hat{x}(t)$. Additionally, vector $\hat{x}(t)$ has a different power magnitude than $x(t)$.

BRIEF DESCRIPTION OF THE DRAWINGS

Embodiments disclosed herein are illustrated by way of example, and not by way of limitation, in the figures of the accompanying drawings in which like reference numerals refer to similar elements and in which.

Figure 1:
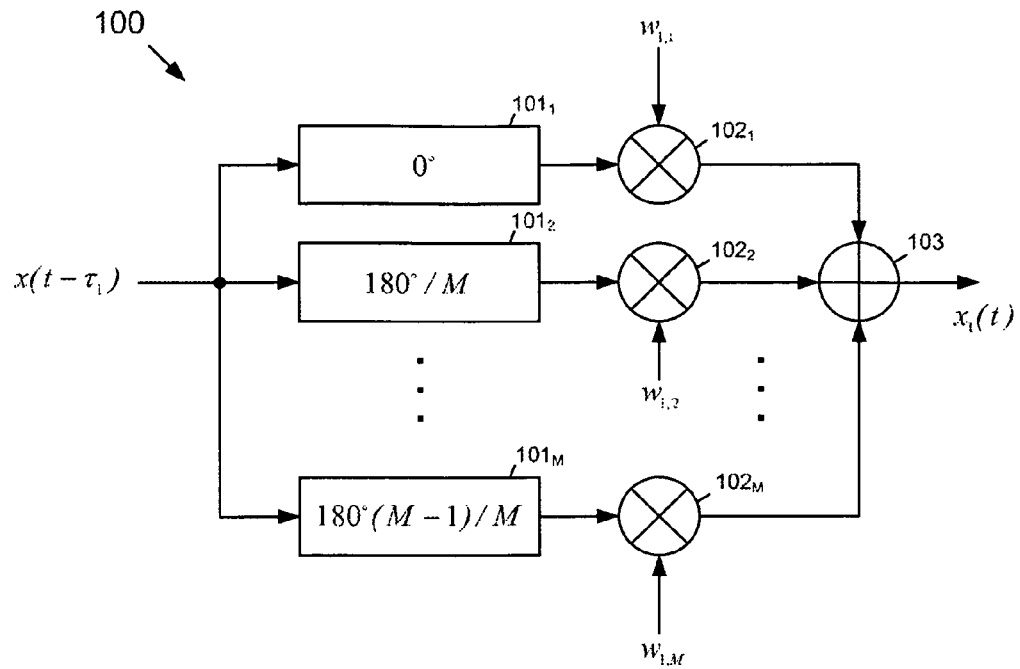
FIG. 1 depicts a functional block diagram of an exemplary embodiment of a vector modulator in which M fixed-phase phase shifters are used according to the subject matter disclosed herein.
Figure 2:
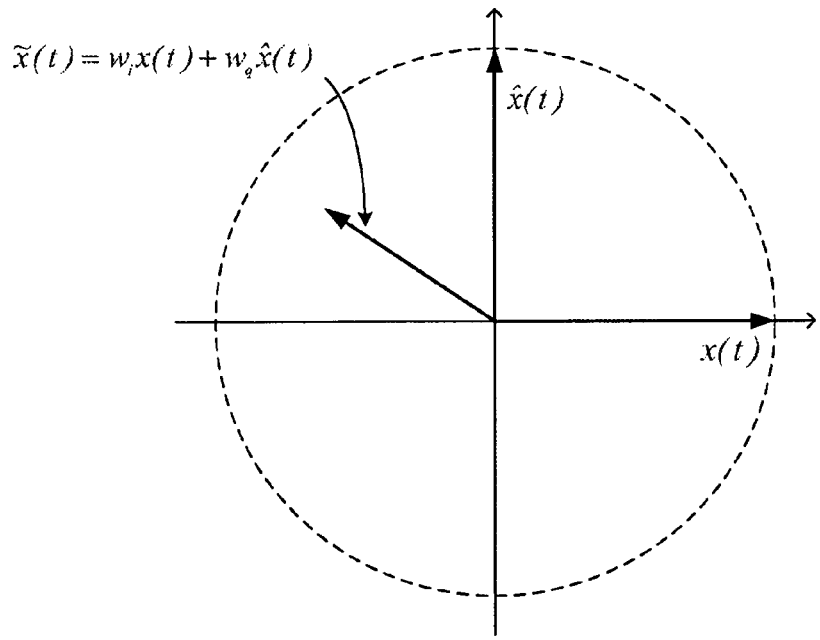
FIG. 2 depicts an exemplary ideal estimated echo signal $\tilde{x}(t)$ that has been estimated by scaling and rotating $x(t)$.
Figure 3:
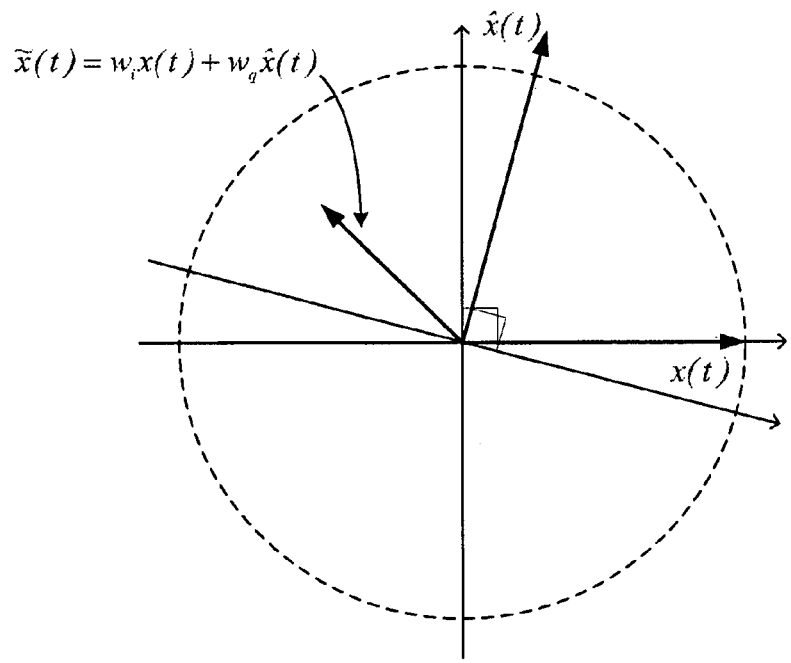
FIG. 3 depicts a vector representation of an exemplary output of a conventional vector modulator in which both phase and amplitude imbalances are present.

It will be appreciated that for simplicity and/or clarity of illustration, elements depicted in the figures have not necessarily been drawn to scale. For example, the dimensions of some of the elements may be exaggerated relative to other elements for clarity. The scaling of the figures does not represent precise dimensions and/or dimensional ratios of the various elements depicted herein. Further, if considered appropriate, reference numerals have been repeated among the figures to indicate corresponding and/or analogous elements.

DESCRIPTION OF THE EMBODIMENTS

Conventional approaches for canceling an echo caused by a transmitted signal and experienced by a receiver of a simultaneous transmit and receive (STR) system have utilized vector modulators having two phase shifters that suffer from phase and amplitude imbalances. Embodiments of the subject matter disclosed herein relate to techniques for echo canceling that is immune to phase and amplitude imbalances by using more than two phase shifters to estimate an echo signal for an STR system. In one exemplary embodiment, an echo-canceling unit utilizes a vector modulator comprising three phase shifters. In other exemplary embodiments, an echo-canceling unit utilizes a vector modulator comprising M phase shifters in which M is an integer equal to or greater than 3. According to the subject matter disclosed herein, each phase shifter may have a different phase imbalance, and although, each of the phase shifters do not have an identical phase shift, any rotation of x(t) can be achieved by the three phase shifters. For example, with phase shifters having a 0°, 60° and 120° phase shifts, up to a ±30° phase imbalance is allowed Reference throughout this specification to "one embodiment" or "an embodiment" means that a particular feature, structure or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments. Additionally, the word "exemplary" is used herein to mean "serving as an example, instance, or illustration." Any embodiment described herein as "exemplary" is not to be construed as necessarily preferred or advantageous over other embodiments.

Various operations may be described herein as multiple discrete operations in turn and in a manner that is most helpful in understanding the claimed subject matter. The order of description, however, should not be construed as to imply that these operations are necessarily order dependent. In particular, these operations need not be performed in the order of presentation. Operations described may be performed in a different order than the described embodiment. Various additional operations may be performed and/or described operations may be omitted in additional embodiments. Additionally, in the following description, numerous specific details are set forth to provide a thorough understanding of embodiments disclosed herein. One skilled in the relevant art will recognize, however, that the embodiments disclosed herein can be practiced without one or more of the specific details, or with other methods, components, materials, and so forth. In other instances, well-known structures, materials, or operations are not shown or described in detail to avoid obscuring aspects of the specification.

Embodiments of the subject matter disclosed herein provide a simultaneous transmit and receive (STR) system that uses a vector modulator comprising M fixed-phase phase shifters for each of K taps of a transmit signal for generating an echo-canceling signal according to the subject matter disclosed herein. That is, embodiments of the subject matter disclosed herein provide an echo canceling technique that is immune to phase and amplitude imbalances by using a vector modulator comprising more than two phase shifters to estimate an echo signal for a Simultaneous Transmit and Receive (STR) system. In one exemplary embodiment, three phase shifters are used. The phase shifters can be either fixed-phase phase shifters or variable-phase phase shifters.

Figure 4:
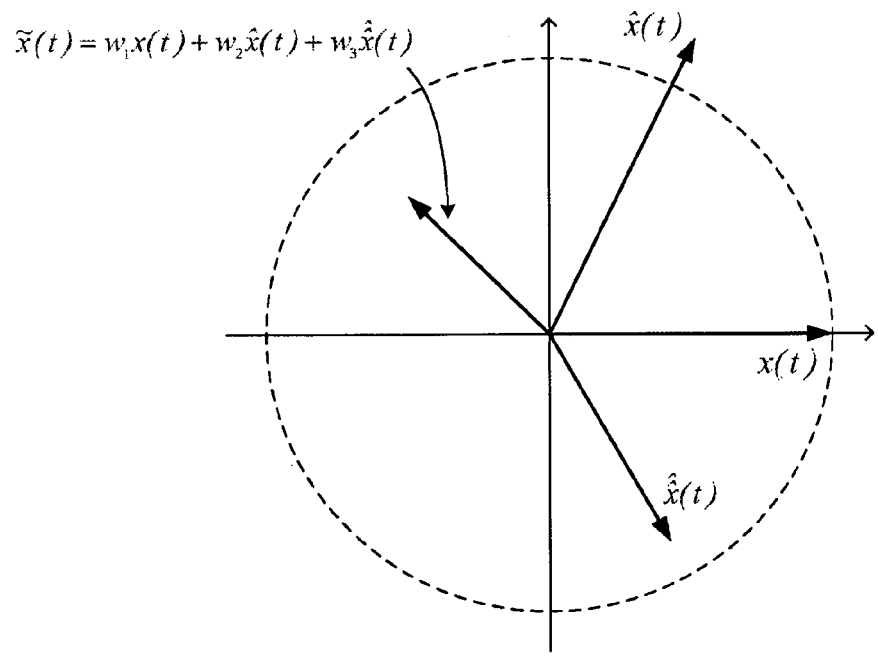
FIG. 4 depicts a vector representation of an exemplary output of a vector modulator comprising three phase shifters according to the subject matter disclosed herein.

FIG. 4 depicts a vector representation of an exemplary output of a vector modulator comprising three phase shifters according to the subject matter disclosed herein. Accordingly, each phase shifter of the vector modulator may have a different phase imbalance, and although, each of the phase shifters do not have an identical phase shift, any rotation of x(t) can be achieved by the three phase shifters. For an exemplary embodiment in which three phase shifters respectively have nominally a 0°, 60° and 120° phase shifts, a phase imbalance of up to a ±30° is allowed.

Assuming K (delay) taps of the transmit signal and M phase shifters, the estimated echo output signal of the m-th vector modulator at the k-th tap can be written as $$x_{k,m}(t)=g_{k,m}\{x_i(t-\tau_k)\cos(\omega(t-\tau_k)-\theta_{k,m})+x_q(t-\tau_k)\sin(\omega(t-\tau_k)-\theta_{k,m})\} \quad (3)$$

in which $g_{k,m}$ is the gain of the phase shifter and represents an amplitude imbalance, $$\theta_{k,m} = \frac{\pi}{M}m + \phi_{k,m}$$

is the phase shift and $\phi_{k,m}$ is the phase imbalance of the phase shifter.

For a complex baseband signal, Equation (3) can be written as $$X_{k,m}(t)=X_{k,m,i}(t)+jX_{k,m,q}(t) \quad (4)$$

in which $$X_{k,m,i}(t)=g_{k,m}\{x_i(t-\tau_k)\cos(\omega\tau_k+\theta_{k,m})-x_q(t-\tau_k)\sin(\omega\tau_k+\theta_{k,m})\} \quad (5)$$

and $$X_{k,m,q}(t)=g_{k,m}\{x_i(t-\tau_k)\sin(\omega\tau_k+\theta_{k,m})+x_q(t-\tau_k)\cos(\omega\tau_k+\theta_{k,m})\}. \quad (6)$$

The estimated echo signal E(t) is $$E(t) = \sum_k \sum_m w_{k,m} X_{k,m}(t). \quad (7)$$

The received signal containing an echo is Y(t); consequently, the output of the echo-canceler is $$Z(t)=Y(t)-E(t). \quad (8)$$

Weights $w_{k,m}$ are selected based on a minimization of cost function $$C=E\{|Z(t)|^2\}. \quad (9)$$

Optimizing weights $w_{k,m}$ by a Least Means Squared (LMS) technique, it follows that $$w_{k,m} = w_{k,m} - \frac{\mu}{2}\left(Z(t)\frac{\partial Z^*(t)}{\partial w_{k,m}} + Z^*(t)\frac{\partial Z(t)}{\partial w_{k,m}}\right). \quad (10)$$

in which $Z^*(t)$ is the complex conjugate of Z(t). Accordingly, $$w_{k,m}=w_{k,m}+\mu Re\{X^*_{k,m}(t)Z(t)\}. \quad (11)$$

FIG. 1 depicts a functional block diagram of an exemplary embodiment of a vector modulator 100 in which M fixed-phase phase shifters are used according to the subject matter disclosed herein. As depicted in FIG. 1, vector modulator 100 comprises fixed-phase phase shifters $101_1$-$101_M$, variable attenuators $102_1$-$102_M$, and a summer 103. An input signal $x(t-\tau_1)$ received from, for this example, the k–1 tap of a transmitted signal (and having a delay of $\tau_1$) is input to each of the M fixed-phase phase shifters $101_1$-$101_M$. Phase shifter $101_1$ is configured for a fixed 0° phase shift, phase shifter $102_2$ is configured for a fixed 180°/M phase shift, . . . , and phase shifter $102_M$ is configured for a fixed 180°(M−1)/M phase shift. The outputs of phase shifters $101_1$-$101_M$ are respectively attenuated by weights $w_{1,1}$-$w_{1,M}$, and then summed by summer 103 to form $x_1(t)$, which is the estimated echo output signal of the M phase shifters at tap K=1. In one exemplary embodiment, M=3. It should be understood that M can be any integer that is equal to or greater than 3. Moreover, one or more taps of the transmitted signal that can be provided, that is, K is an integer greater than 0.

Figure 5A:
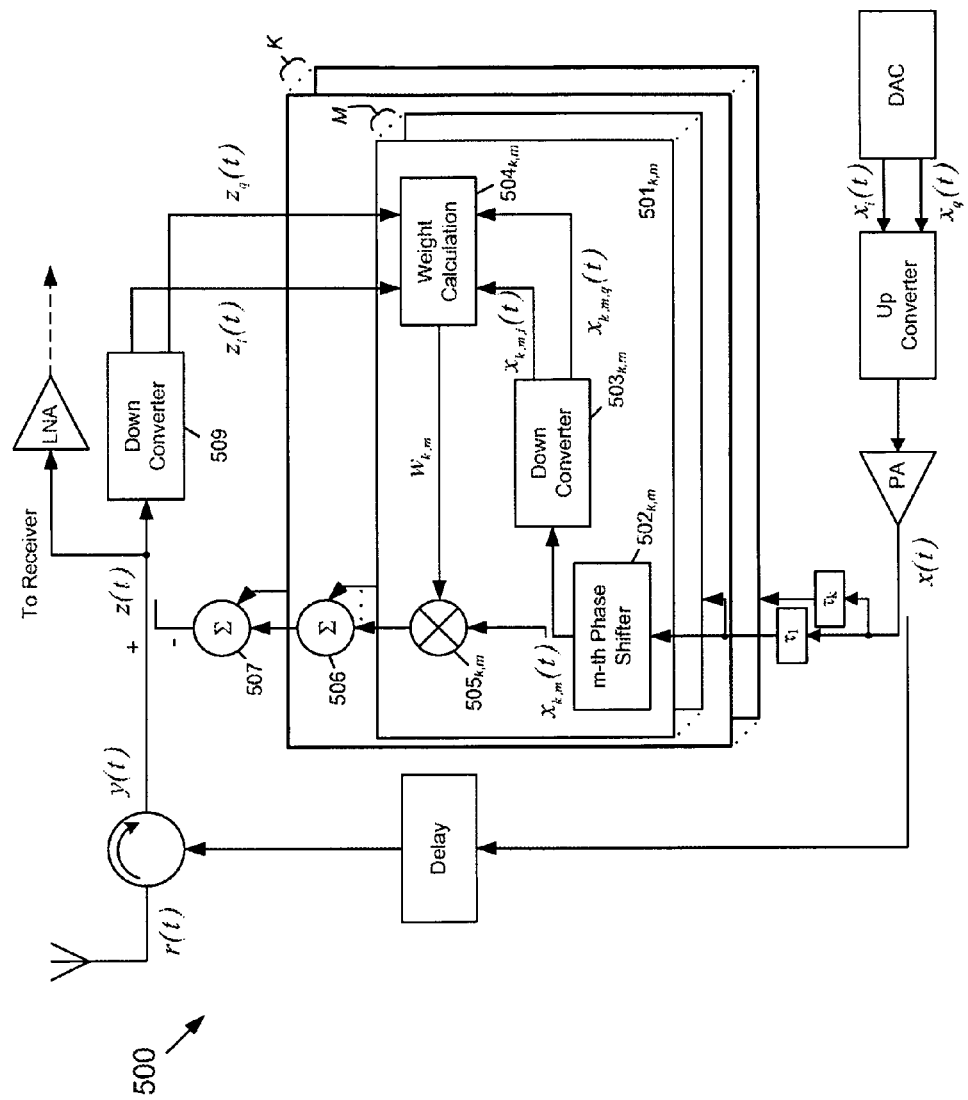
FIG. 5A depicts a functional block diagram of an exemplary embodiment of an STR system having an echo-canceling unit that uses M fixed-phase phase shifters for each of K taps of a transmit signal for generating an echo-canceling signal according to the subject matter disclosed herein.

FIG. 5A depicts a functional block diagram of an exemplary embodiment of a simultaneous transmit and receive (STR) system 500 having an echo-canceling unit that uses M fixed-phase phase shifters for each of K taps of a transmit signal for generating an echo-canceling signal according to the subject matter disclosed herein. STR system 500 comprises M vector modulators 501 for each of K taps. The general nomenclature used in FIG. 5A for a vector modulator is $501_{k,m}$ in which index k represents the particular tap associated with the vector modulator, and index m represents the particular vector modulator.

As depicted in FIG. 5A, a vector modulator $501_{k,m}$ comprises a fixed-phase phase shifter $502_{k,m}$, a down converter $503_{k,m}$, a weight calculation unit (device, module or circuit) $504_{k,m}$, and a variable attenuator $505_{k,m}$. In one exemplary embodiment, fixed-phase phase shifter $502_{k,m}$ together with the other phase shifters of the same tap k are configured similarly as the fixed-phase phase shifters depicted in FIG. 1. That is, in one exemplary embodiment, phase shifter $502_{k,1}$ is configured for a fixed 0° phase shift, phase shifter $502_{k,2}$ is configured for a fixed 180°/M phase shift, . . . , and phase shifter $502_{k,M}$ is configured for a fixed 180°(M−1)/M phase shift. The output of phase shifter $502_{k,m}$ is coupled to a down converter $503_{k,m}$ that down converts the output of phase shifter $502_{k,m}$ in a well-known manner to generate in-phase component $x_{k,m,i}(t)$ and quadrature-phase component $x_{k,m,q}(t)$. The outputs of down converter $503_{k,m}$ are input to weight calculation device $504_{k,m}$. Weight calculation device $504_{k,m}$ receives the in-phase component $z_i(t)$ and quadrature-phase component $z_q(t)$ of the echo-canceled signal z(t) and determines weight $w_{k,m}$, which is coupled to one input of variable attenuator $505_{k,m}$. Additional details regarding weight calculation device $504_{k,m}$ are described in connection with FIG. 5B. The output of phase shifter $502_{k,m}$ is coupled to the other input of variable attenuator $505_{k,m}$ to form vector component $x_{k,m}(t)$.

The M vector components for the k-th tap are summed by summer 506. The K vector components $x_{k,m}(t)$ for each of the K taps (respectively having delays $\tau_1$ through $\tau_K$) are summed by summer 507, and the output of summer 507 is coupled into a received signal containing an echo y(t) in a well-known manner to form echo-canceled signal z(t). Echo-canceled signal z(t) is coupled to the receiver through a low-noise amplifier (LNA) 508 and to the input of a down converter 509. Down converter 509 down converts echo-canceled signal z(t) in a well-known manner and outputs the in-phase component $z_i(t)$ and quadrature-phase component $z_q(t)$ that are input to weight calculation device $504_{k,m}$.

It should be understood that some components in FIG. 5A have been indicated, but are not described herein because they are well known and an explanation is not necessary for understanding the subject matter disclosed herein. Additionally, in one exemplary embodiment, M=3. It should again be understood that M can be any integer that is equal to or greater than 3. Moreover, one or more taps of the transmitted signal that can be provided, that is, K is an integer greater than 0.

Figure 5B:
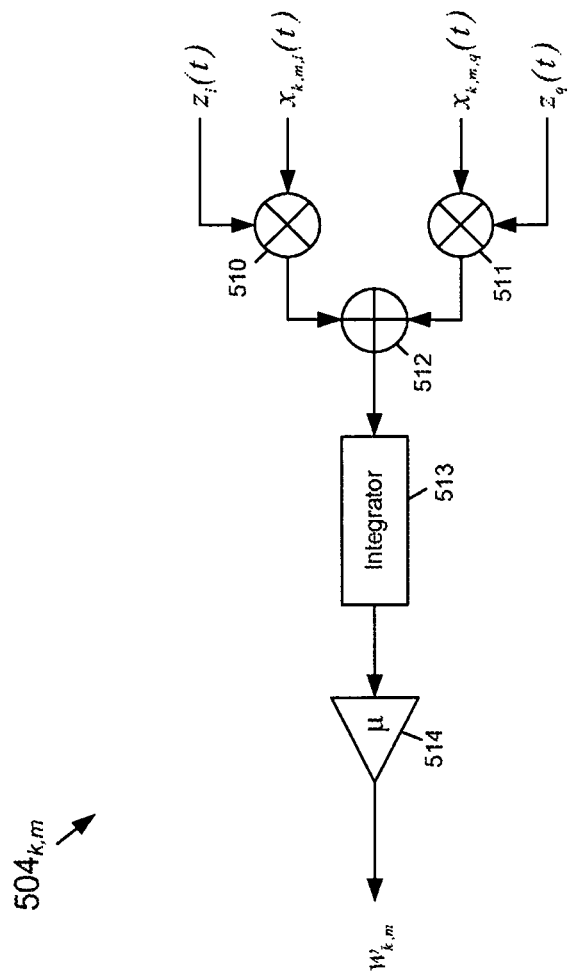
FIG. 5B depicts a functional block diagram of an exemplary embodiment of a weight calculation device according to the subject matter disclosed herein.

FIG. 5B depicts a functional block diagram of an exemplary embodiment of a weight calculation device $504_{k,m}$ according to the subject matter disclosed herein. Weight calculation device $504_{k,m}$ comprises multipliers 510 and 511, a summer 512, an integrator 513 and an attenuator 514. Multiplier 510 receives as inputs $x_{k,m,i}(t)$ and $z_i(t)$. Similarly, multiplier 511 receives as inputs $x_{k,m,q}(t)$ and $z_q(t)$. The outputs of multipliers 510 and 511 are summed by summer 512. The output of summer 512 is integrated by integrator 513. The output of integrator 513 is attenuated by attenuator 514 having gain μ. Weight calculation device $504_{k,m}$ operates in accordance with Equations (10) and (11) to output weight signal $w_{k,m}$, which is used to weight the amplitude of the vector component $x_{k,m}(t)$.

Embodiments of the subject matter disclosed herein also provide a simultaneous transmit and receive (STR) system that uses M variable-phase phase shifters for each of K taps of a transmit signal for generating an echo-canceling signal according to the subject matter disclosed herein. That is, embodiments of the subject matter disclosed herein also provide an echo canceling technique that is immune to phase and amplitude imbalances by using more than two variable-phase phase shifters to estimate an echo signal for an STR system.

According to embodiments disclosed herein, the estimated echo output signal with a variable phase shift $\theta_k$ of the m-th vector modulator at k-th tap can be written as $$x_k(t) = g_k \{ x_i(t-\tau_k)\cos(\omega(t-\tau_k)-\theta_k) + x_q(t-\tau_k)\sin(\omega(t-\tau_k)-\theta_k) \}. \tag{12}$$

The $w_k$ is derived by the same approach as used for the exemplary STR system 500 depicted in FIG. 5A. The phase shift $\theta_k$ is obtained by $$\theta_k = \theta_k - \frac{\mu}{2}\frac{\partial C}{\partial \theta_k} = \theta_k - \frac{\mu}{2}\left(Z^*(t)\frac{\partial Z(t)}{\partial \theta_k} + Z(t)\frac{\partial Z^*(t)}{\partial \theta_k}\right). \tag{13}$$

Thus, $$\theta_k = \theta_k + \frac{\mu}{2}w_k(jZ^*(t)X_k(t)e^{j\theta(w_k)} - jZ(t)X_k^*(t)e^{-j\theta(w_k)}). \tag{14}$$

And, $$\theta_k = \theta_k + \mu w_k Re(-jZ(t)X^*_k(t)e^{-j\theta(w_k)}). \tag{15}$$

For simplicity, the phase distortion is ignored and $|w_k|$ can be absorbed in step size μ. Consequently, $$\theta_k \approx \theta_k + \mu \cdot sign(w_k) Im(Z(t)X^*_k(t)). \tag{16}$$

Figure 6A:
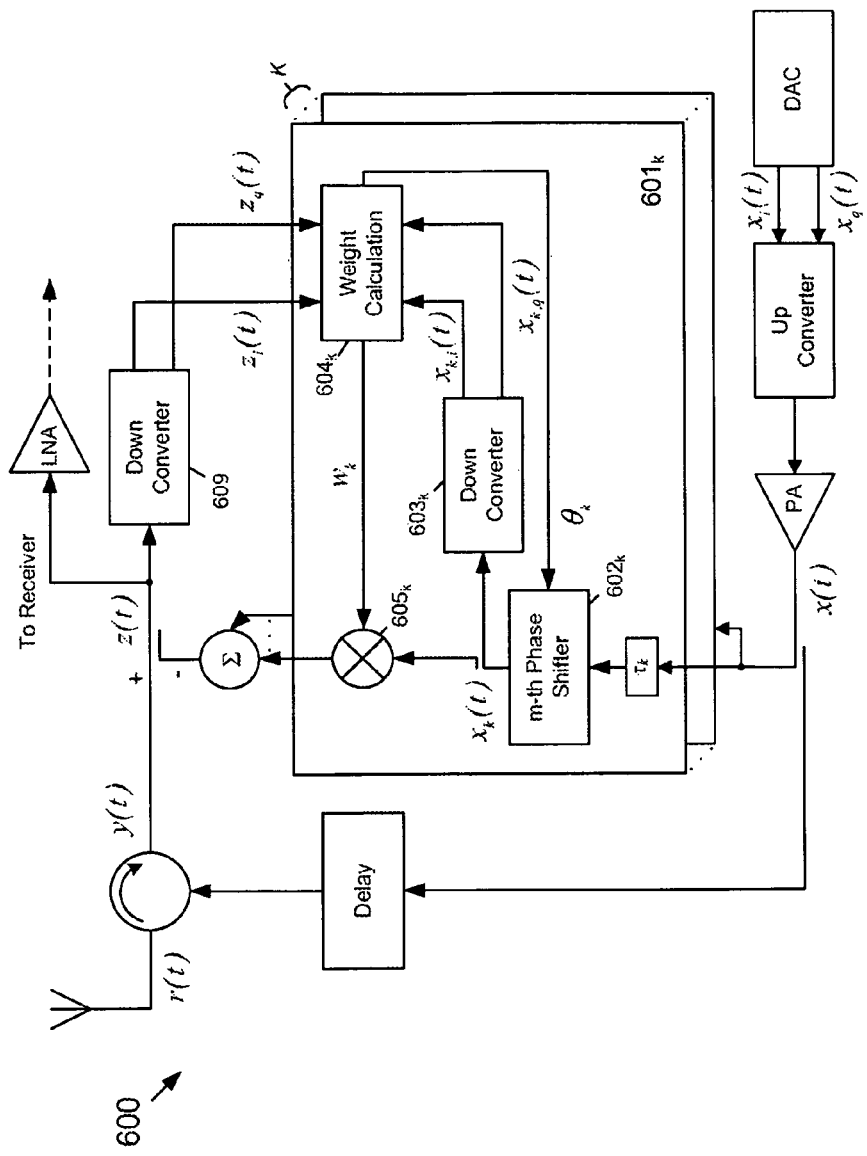
FIG. 6A depicts a functional block diagram of an exemplary embodiment of an STR system having an echo-canceling unit that uses M variable-phase phase shifters for K taps of a transmit signal for generating an echo-canceling signal according to the subject matter disclosed herein.

FIG. 6A depicts a functional block diagram of an exemplary embodiment of a simultaneous transmit and receive (STR) system 600 having an echo-canceling unit that uses M variable-phase phase shifters for K taps of a transmit signal for generating an echo-canceling signal according to the subject matter disclosed herein. STR system 600 comprises a vector modulator 601 for each of K taps. The general nomenclature used in FIG. 6A for a vector modulator is $601_k$ in which index k represents the particular tap associated with the vector modulator.

As depicted in FIG. 6A, a vector modulator $601_k$ comprises a phase shifter $602_k$, a down converter $603_k$, a weight calculation unit (device, module or circuit) $604_k$ and a variable attenuator $605_k$. In one exemplary embodiment, phase shifter $602_k$ comprises a variable-phase phase shifter. The output of phase shifter $602_k$ is coupled to a down converter $603_k$ that down converts the output of phase shifter $602_k$ in a well-known manner to generate in-phase component $x_{k,i}(t)$ and quadrature-phase component $x_{k,q}(t)$. The outputs of down converter $603_k$ are input to weight calculation device $604_k$. Weight calculation device $604_k$ receives the in-phase component $z_i(t)$ and quadrature-phase component $z_q(t)$ of the echo-canceled signal z(t) and determines weight $w_k$ and $\theta_k$. Weight $w_k$ is coupled to one input of variable attenuator $605_k$, and phase shift $\theta_k$ is coupled to phase shifter $602_k$. Additional details regarding weight calculation device $604_k$ are described in connection with FIG. 6B. The output of phase shifter $602_k$ is coupled to the other input of variable attenuator $605_k$ to form vector component $x_k(t)$.

The K vector components for each of the K taps (respectively having delays $\tau_1$ through $\tau_K$) are summed by summer 606, and the output of summer 606 is coupled into received signal containing an echo y(t) in a well-known manner to form echo-canceled signal z(t). Echo-canceled signal z(t) is coupled to the receiver through a low-noise amplifier (LNA) 608 and to the input of a down converter 609. Down converter 609 down converts echo-canceled signal z(t) in a well-known manner and outputs the in-phase component $z_i(t)$ and quadrature-phase component $z_q(t)$ that are input to weight calculation device $604_k$.

Figure 6B:
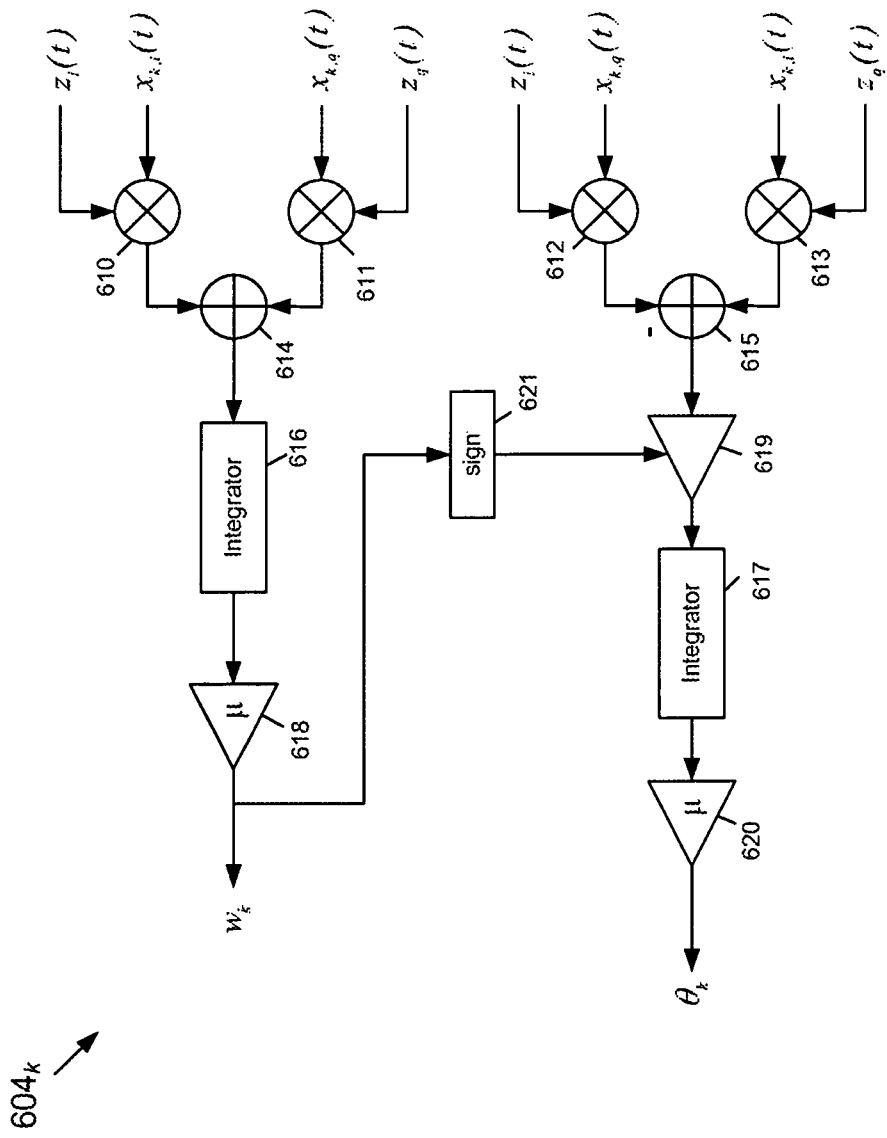
FIG. 6B depicts a functional block diagram of an exemplary embodiment of a weight calculation device according to the subject matter disclosed herein.

It should be understood that some components in FIG. 6A have been indicated, but are not described herein because they are well known and an explanation is not necessary for understanding the subject matter disclosed herein. Additionally, in one exemplary embodiment, one variable phase shifter is used per tap and in which there are multiple taps (K) of the transmit signal. FIG. 6B depicts a functional block diagram of an exemplary embodiment of a weight calculation device $604_k$ according to the subject matter disclosed herein. Weight calculation device $604_k$ comprises multipliers 610-613, summers 614 and 615, integrator 616 and 617, attenuators 618 and 620, sign inverter 619, and sign device 621. Multiplier 610 receives as inputs $x_{k,i}(t)$ and $z_i(t)$. Similarly, multiplier 611 receives as inputs $x_{k,q}(t)$ and $z_q(t)$. The outputs of multipliers 610 and 611 are summed by summer 614. The output of summer 614 is integrated by integrator 616. The output of integrator 616 is attenuated by attenuator 618 having gain μ to generate weight signal $w_k$ in accordance with Equations (10) and (11), which is used to weight the amplitude of the vector component $x_k(t)$.

Multiplier 612 receives as inputs $x_{k,i}(t)$ and $z_i(t)$. Similarly, multiplier 613 receives as inputs $x_{k,q}(t)$ and $z_q(t)$. The output of multiplier 613 is subtracted from the output of multiplier 612 at summer 615. The output of summer 615 is input to sign inverter 619, which receives a sign input control signal from sign device 621. Sign device receives the sign of weight $w_k$. The output of sign inverter 619 is integrated by integrator 617. The output of integrator 617 is attenuated by attenuator 620 having gain μ to generate variable phase-shift control signal $\theta_k$ in accordance with Equations (13)-(16). Variable phase-shift control signal $\theta_k$ is input to phase shifter $602_k$ and controls the phase shift of phase shifter $602_k$.

Figure 7:
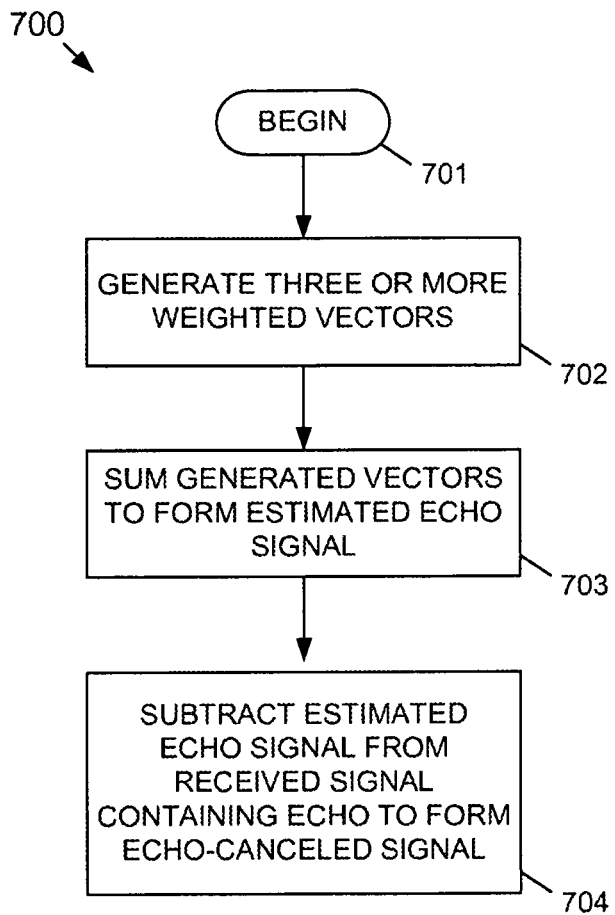
FIG. 7 depicts a flow diagram of an exemplary process to provide an echo canceling technique that is immune to phase and amplitude imbalances by using more than two phase shifters to estimate an echo signal for an STR system according to the subject matter disclosed herein.

FIG. 7 depicts a flow diagram of an exemplary process 700 to provide an echo canceling technique that is immune to phase and amplitude imbalances by using more than two phase shifters to estimate an echo signal for an STR system according to the subject matter disclosed herein. At 701 the process begins. Flow continues to 702 where three or more weighted vectors are generated. In one exemplary embodiment, the three or more weighted vectors are generated in accordance with Equations (3)-(11) using fixed-phase phase shifters. FIGS. 5A and 5B depict exemplary embodiments of the subject matter disclosed herein to generate the three or more weighted vectors are generated in accordance with Equations (3)-(11) using fixed-phase phase shifters. In another exemplary embodiment, one or more weighted vectors are generated in accordance with Equations (12)-(16) using variable-phase phase shifters. FIGS. 6A and 6B depict exemplary embodiments of the subject matter disclosed herein to generate the one or more weighted vectors are generated in accordance with Equations (12)-(16) using variable-phase phase shifters.

Flow continues to 703 wherein the three or more weighted vectors are summed to form an estimated echo output signal $x_{k,m}(t)$. Flow continues to 704 where the estimated echo signal is subtracted from a received signal containing an echo to form an echo-canceled signal z(t).

Figure 8:
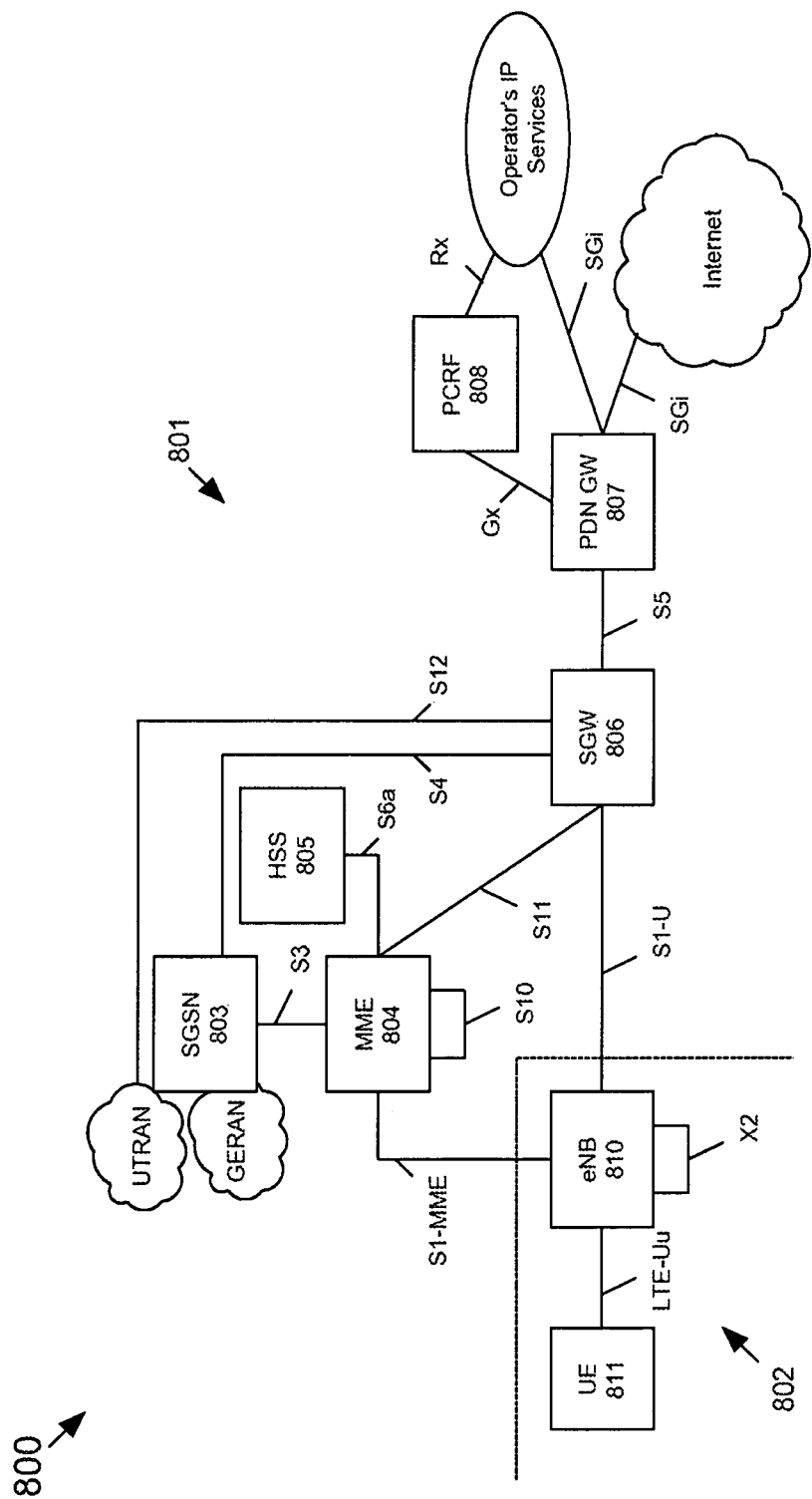
FIG. 8 shows an exemplary block diagram of the overall architecture of a 3GPP LTE network that utilizes any of the techniques disclosed herein to provide an echo canceling technique that is immune to phase and amplitude imbalances by using more than two phase shifters to estimate an echo signal for an STR system according to the subject matter disclosed herein.

FIG. 8 shows an exemplary block diagram of the overall architecture of a $3^{rd}$ Generation Partnership Project (3GPP) Long Term Evolution (LTE) network 800 that utilizes any of the techniques disclosed herein to provide an echo canceling technique that is immune to phase and amplitude imbalances by using more than two phase shifters to estimate an echo signal for an STR system according to the subject matter disclosed herein. FIG. 8 also generally shows exemplary network elements and exemplary standardized interfaces. At a high level, network 800 comprises a core network (CN) 801 (also referred to as an evolved Packet System (EPC)), and an air-interface access network E-UTRAN 802. CN 801 is responsible for the overall control of the various User Equipment (UE) connected to the network and establishment of the bearers. CN 801 may include functional entities, such as a home agent HA and/or an ANDSF server or entity, although not explicitly depicted. E-UTRAN 802 is responsible for all radio-related functions.

The main exemplary logical nodes of CN 801 include, but are not limited to, a Serving GPRS Support Node 803, the Mobility Management Entity 804, a Home Subscriber Server (HSS) 805, a Serving Gate (SGW) 806, a PDN Gateway 807 and a Policy and Charging Rules Function (PCRF) Manager 808. The functionality of each of the network elements of CN 801 is well known and is not described herein. Each of the network elements of CN 801 are interconnected by well-known exemplary standardized interfaces, some of which are indicated in FIG. 8, such as interfaces S3, S4, S5, etc., although not described herein.

While CN 801 includes many logical nodes, the E-UTRAN access network 802 is formed by one node, the evolved NodeB (base station (BS), eNB or eNodeB) 810, which connects to one or more User Equipment (UE) 811, of which only one is depicted in FIG. 8. UE 811 is also referred to herein as a wireless device (WD) and/or a subscriber station (SS), and can include an M2M-type device. In one exemplary configuration, a single cell of an E-UTRAN access network 802 provides one substantially localized geographical transmission point (having multiple antenna devices) that provides access to one or more UEs. In another exemplary configuration, a single cell of an E-UTRAN access network 802 provides multiple geographically substantially isolated transmission points (each having one or more antenna devices) with each transmission point providing access to one or more UEs simultaneously and with the signaling bits defined for the one cell so that all UEs share the same spatial signaling dimensioning. For normal user traffic (as opposed to broadcast), there is no centralized controller in E-UTRAN; hence the E-UTRAN architecture is said to be flat. The eNBs are normally interconnected with each other by an interface known as "X2" and to the EPC by an S1 interface. More specifically, an eNB is connected to MME 804 by an S1-MME interface and to SGW 806 by an S1-U interface. The protocols that run between the eNBs and the UEs are generally referred to as the "AS protocols." Details of the various interfaces are well known and not described herein.

The eNB 810 hosts the PHYsical (PHY), Medium Access Control (MAC), Radio Link Control (RLC), and Packet Data Control Protocol (PDCP) layers, which are not shown in FIG. 8, and which include the functionality of user-plane header-compression and encryption. The eNB 810 also provides Radio Resource Control (RRC) functionality corresponding to the control plane, and performs many functions including radio resource management, admission control, scheduling, enforcement of negotiated Up Link (UL) QoS, cell information broadcast, ciphering/deciphering of user and control plane data, and compression/decompression of DL/UL user plane packet headers.

The RRC layer in eNB 810 covers all functions related to the radio bearers, such as radio bearer control, radio admission control, radio mobility control, scheduling and dynamic allocation of resources to UEs in both uplink and downlink, header compression for efficient use of the radio interface, security of all data sent over the radio interface, and connectivity to the EPC. The RRC layer makes handover decisions based on neighbor cell measurements sent by UE 811, generates pages for UEs 811 over the air, broadcasts system information, controls UE measurement reporting, such as the periodicity of Channel Quality Information (CQI) reports, and allocates cell-level temporary identifiers to active UEs 811. The RRC layer also executes transfer of UE context from a source eNB to a target eNB during handover, and provides integrity protection for RRC messages. Additionally, the RRC layer is responsible for the setting up and maintenance of radio bearers.

Figure 9:
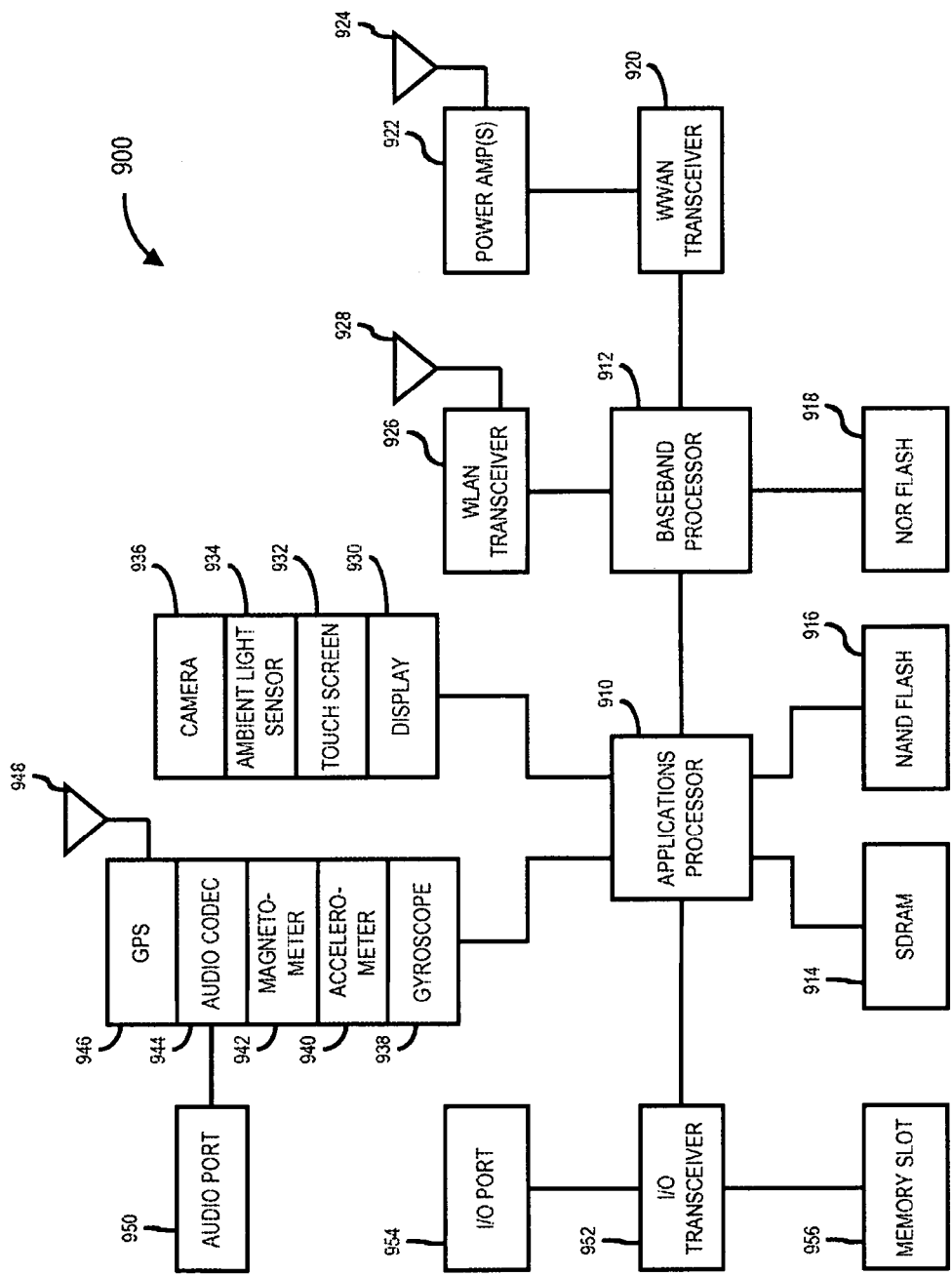
FIG. 9 depicts an exemplary functional block diagram of an information-handling system that utilizes any of the techniques disclosed herein to provide an echo canceling technique that is immune to phase and amplitude imbalances by using more than two phase shifters to estimate an echo signal for an STR system according to the subject matter disclosed herein.

FIG. 9 depicts an exemplary functional block diagram of an information-handling system 900 that utilizes any of the techniques disclosed herein to provide an echo canceling technique that is immune to phase and amplitude imbalances by using more than two phase shifters to estimate an echo signal for an STR system according to the subject matter disclosed herein. Information-handling system 900 of FIG. 9 may tangibly embody one or more of any of the exemplary network elements and or functional entities of the network as shown in and described with respect to FIG. 8. Although information-handling system 900 represents one example of several types of computing platforms, such as, but not limited to, eNB 810, and for a terminal device, such as a mobile station (MS), or User Equipment (UE) 811, information-handling system 900 may include more or fewer elements and/or different arrangements of elements than shown in FIG. 9, and the scope of the claimed subject matter is not limited in these respects.

In one or more embodiments, information-handling system 900 may comprise one or more applications processor 910 and a baseband processor 912. Applications processor 910 may be utilized as a general purpose processor to run applications and the various subsystems for information-handling system 900. Applications processor 910 may include a single core or alternatively may include multiple processing cores wherein one or more of the cores may comprise a digital signal processor or digital signal processing core. Furthermore, applications processor 910 may include a graphics processor or coprocessor disposed on the same chip, or alternatively a graphics processor coupled to applications processor 910 may comprise a separate, discrete graphics chip. Applications processor 910 may include on-board memory, such as cache memory, and further may be coupled to external memory devices such as synchronous dynamic random access memory (SDRAM) 914 for storing and/or executing applications during operation, and NAND flash 916 for storing applications and/or data even when information-handling system 900 is powered off. Baseband processor 912 may control the broadband radio functions for information-handling system 900. Baseband processor 912 may store code for controlling such broadband radio functions in a NOR flash 918. Baseband processor 912 controls a wireless wide area network (WWAN) transceiver 920 which is used for modulating and/or demodulating broadband network signals, for example, for communicating via a 3GPP LTE network or the like as discussed herein with respect to FIG. 8. The WWAN transceiver 920 couples to one or more power amplifiers 922 that are respectively coupled to one or more antennas 924 for sending and receiving radio-frequency signals via the WWAN broadband network. The baseband processor 912 also may control a wireless local area network (WLAN) transceiver 926 coupled to one or more suitable antennas 928 and that may be capable of communicating via a Bluetooth-based standard, an IEEE 802.11-based standard, an IEEE 802.16-based standard, an IEEE 802.18-based wireless network standard, an LTE-based wireless network standard, a 3GPP-based protocol wireless network, a Third Generation Partnership Project Long Term Evolution (3GPP LTE) based wireless network standard, a 3GPP2 Air Interface Evolution (3GPP2 AIE) based wireless network standard, a UMTS-based protocol wireless network, a CDMA2000-based protocol wireless network, a GSM-based protocol wireless network, a cellular-digital-packet-data-based (CDPD-based) protocol wireless network, or a Mobitex-based protocol wireless network, or the like. It should be noted that these are merely example implementations for applications processor 910 and baseband processor 912, and the scope of the claimed subject matter is not limited in these respects. For example, any one or more of SDRAM 914, NAND flash 916 and/or NOR flash 918 may comprise other types of memory technology, such as magnetic-based memory, chalcogenide-based memory, phase-change-based memory, optical-based memory, or ovonic-based memory, and the scope of the claimed subject matter is not limited in this respect.

In one or more embodiments, applications processor 910 may drive a display 930 for displaying various information or data, and may further receive touch input from a user via a touch screen 932 for example via a finger or a stylus. An ambient light sensor 934 may be utilized to detect an amount of ambient light in which information-handling system 900 is operating, for example, to control a brightness or contrast value for display 930 as a function of the intensity of ambient light detected by ambient light sensor 934. One or more cameras 936 may be utilized to capture images that are processed by applications processor 910 and/or at least temporarily stored in NAND flash 916. Furthermore, applications processor may couple to a gyroscope 938, accelerometer 940, magnetometer 942, audio coder/decoder (CODEC) 944, and/or global positioning system (GPS) controller 946 coupled to an appropriate GPS antenna 948, for detection of various environmental properties including location, movement, and/or orientation of information-handling system 900. Alternatively, controller 946 may comprise a Global Navigation Satellite System (GNSS) controller. Audio CODEC 944 may be coupled to one or more audio ports 950 to provide microphone input and speaker outputs either via internal devices and/or via external devices coupled to information-handling system via the audio ports 950, for example, via a headphone and microphone jack. In addition, applications processor 910 may couple to one or more input output (I/O) transceivers 952 to couple to one or more I/O ports 954 such as a universal serial bus (USB) port, a high-definition multimedia interface (HDMI) port, a serial port, and so on. Furthermore, one or more of the I/O transceivers 952 may couple to one or more memory slots 956 for optional removable memory, such as secure digital (SD) card or a subscriber identity module (SIM) card, although the scope of the claimed subject matter is not limited in these respects.

Figure 10:
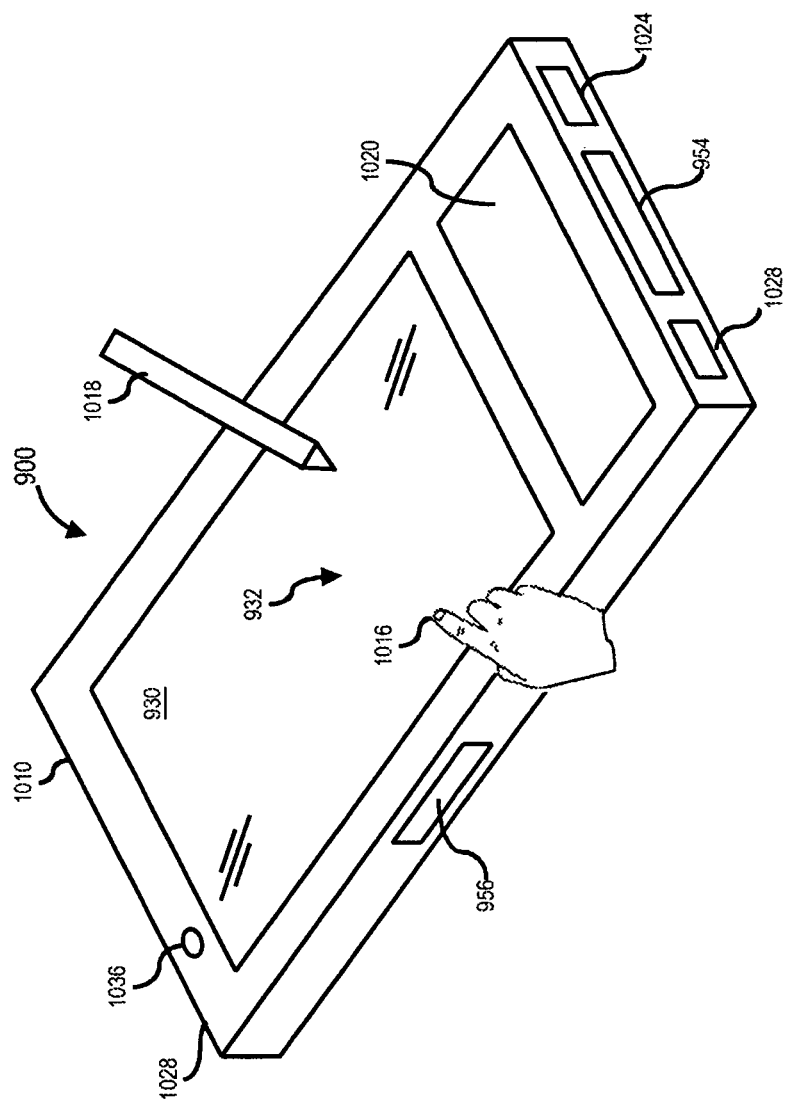
FIG. 10 depicts an isometric view of an exemplary embodiment of the information-handling system of FIG. 9 that optionally may include a touch screen in accordance with one or more embodiments.

FIG. 10 depicts an isometric view of an exemplary embodiment of the information-handling system of FIG. 9 that optionally may include a touch screen in accordance with one or more embodiments. For example, FIG. 10 shows an example implementation of information-handling system 900 of FIG. 9 tangibly embodied as a cellular telephone, smartphone, or tablet-type device or the like. In one or more embodiments, the information-handling system 900 may comprise a housing 1010 having a display 930 that may include a touch screen 932 for receiving tactile input control and commands via a finger 1016 of a user and/or a via stylus 918 to control one or more applications processors 910. The housing 1010 may house one or more components of information-handling system 900, for example, one or more applications processors 910, one or more of SDRAM 914, NAND flash 916, NOR flash 918, baseband processor 912, and/or WWAN transceiver 920. The information-handling system 900 further may optionally include a physical actuator area 1020 that may comprise a keyboard or buttons for controlling information-handling system 900 via one or more buttons or switches. The information-handling system 900 may also include a memory port or slot 956 for receiving non-volatile memory, such as flash memory, for example, in the form of a secure digital (SD) card or a subscriber identity module (SIM) card. Optionally, the information-handling system 900 may further include one or more speakers and/or microphones 1024 and a connection port 954 for connecting the information-handling system 900 to another electronic device, dock, display, battery charger, and so on. Additionally, information-handling system 900 may include a headphone or speaker jack 1028 and one or more cameras 1036 on one or more sides of the housing 1010. It should be noted that the information-handling system 900 of FIGS. 9 and 10 may include more or fewer elements than shown, in various arrangements, and the scope of the claimed subject matter is not limited in this respect.

Figure 11:
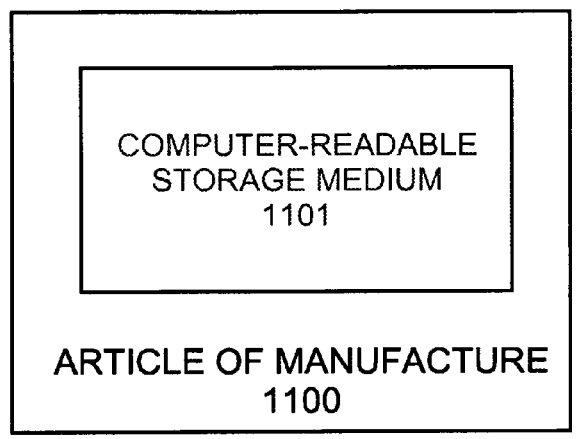
FIG. 11 depicts an exemplary embodiment of an article of manufacture comprising a non-transitory computer-readable storage medium having stored thereon computer-readable instructions that, when executed by a computer-type device, results in any of the various techniques and methods according to the subject matter disclosed herein.

FIG. 11 depicts an exemplary embodiment of an article of manufacture 1100 comprising a non-transitory computer-readable storage medium 1101 having stored thereon computer-readable instructions that, when executed by a computer-type device, results in any of the various techniques and methods according to the subject matter disclosed herein. Exemplary computer-readable storage mediums that could be used for computer-readable storage medium 1101 could be, but are not limited to, a semiconductor-based memory, an optically based memory, a magnetic-based memory, or a combination thereof.

These modifications can be made in light of the above detailed description. The terms used in the following claims should not be construed to limit the scope to the specific embodiments disclosed in the specification and the claims. Rather, the scope of the embodiments disclosed herein is to be determined by the following claims, which are to be construed in accordance with established doctrines of claim interpretation.

The invention claimed is:

1. An echo-canceler for a simultaneous transmit and receive (STR) system, comprising:
at least three phase shifters, each respective phase shifter being coupled to a transmit signal of the STR system to generate an output signal comprising a selected phase shift with respect to the transmit signal, the transmit signal comprising a 3$^{rd}$ Generation Partnership Project (3GPP) Long Term Evolution (LTE) transmit signal;
a weight calculation unit coupled to the output signal of each respective phase shifter, each weight calculation unit to generate a corresponding amplitude-weight signal for the output signal of the phase shifter;
a variable attenuator to attenuate the output signal of each respective phase shifter based on the corresponding amplitude-weight signal to form an echo-cancelation signal component corresponding to the phase shifter; and
a first summer to sum the respective echo-cancelation signal components into a received signal containing an echo signal to form an echo-canceled signal.

2. The system according to claim 1, wherein each phase shifter is a fixed-phase phase shifter.

3. The system according to claim 1, wherein a first phase shifter of the at least three phase shifters generates a nominal phase shift of 0° with respect to the transmit signal, a second phase shifter of the at least three phase shifters generates a nominal phase shift of 60° with respect to the transmit signal, and a third phase shifter of the at least three phase shifters generates a nominal phase shift of 120° with respect to the transmit signal.

4. The system according to claim 1, wherein the at least three phase shifters comprise part of a vector modulator.

5. The system according to claim 1, wherein the system further comprises a plurality of vector modulators, each vector modulator comprising:
at least three phase shifters, each phase shifter being coupled to the transmit signal of the STR system at a selected tap of the transmit signal to generate an output signal comprising a selected phase shift from the transmit signal with respect to the selected tap;
a weight calculation unit coupled to the output signal of each respective phase shifter of the vector modulator to generate a corresponding amplitude-weight signal for the output signal of the phase shifter;
a variable attenuator to attenuate the output signal of each respective phase shifter based on the corresponding amplitude-weight signal to form an echo-cancelation signal component corresponding to the output signal of the phase shifter; and
a second summer to sum the respective echo-cancelation signal of the vector modulator into an echo-cancelation signal for the vector modulator, and
wherein the first summer sums the respective echo-cancelation signals of the respective vector modulators into the received signal containing an echo signal to form the echo-canceled signal.

6. The system according to claim 5, wherein a first phase shifter of the at least three phase shifters of at least one vector modulator generates a nominal phase shift of 0° from the transmit signal with respect to the selected tap, a second phase shifter of the at least three phase shifters of the at least one vector modulator generates a nominal phase shift of 60° from the transmit signal with respect to the selected tap, and a third phase shifter of the at least three phase shifters of the at least one vector modulator generates a nominal phase shift of 120° from the transmit signal with respect to the selected tap.

7. The system according to claim 1, wherein each phase shifter is a variable-phase phase shifter, and
wherein the weight calculation unit is to further generate a variable-phase weight signal corresponding to the output signal of the phase shifter that varies a phase of the phase shifter.

8. The system according to claim 7, wherein each respective phase shifter is coupled to the transmit signal of the STR system at a different selected tap of the transmit signal to generate an output signal comprising a phase shift from the transmit signal with respect to the selected tap based on the variable-phase weight signal.

9. An information-handling system, comprising:
a receiver capable of receiving a signal, the received signal containing an echo signal and comprising a 3$^{rd}$ Generation Partnership Project (3GPP) Long Term Evolution (LTE) downlink signal;
a transmitter capable of transmitting a transmit signal simultaneously as the receiver receives the received signal; and
an echo-canceling unit coupled to the transmit signal and the received signal to generate an estimated echo signal, the echo-canceler comprising:
   at least three phase shifters, each respective phase shifter to generate an output signal comprising a selected phase shift with respect to the transmit signal;
   a first signal attenuator to attenuate the output signal of each respective phase shifter based on a weight signal corresponding to the output signal of the phase shifter to form an echo-cancelation signal component corresponding to the phase shifter; and
   a second signal combiner to combine the respective echo-cancelation signal components into the received signal containing the echo signal to form an echo-canceled signal.

10. The information-handling system according to claim 9, wherein the echo-canceling unit further comprises a weight calculation unit to generate the weight signal for the output signal of the phase shifter.

11. The information-handling system according to claim 9, wherein each phase shifter is a fixed-phase phase shifter.

12. The information-handling system according to claim 9, wherein a first phase shifter of the at least three phase shifters generates a nominal phase shift of 0° with respect to the transmit signal, a second phase shifter of the at least three phase shifters generates a nominal phase shift of 60° with respect to the transmit signal, and a third phase shifter of the at least three phase shifters generates a nominal phase shift of 120° with respect to the transmit signal.

13. The information-handling system according to claim 9, wherein the at least three phase shifters comprise part of a vector modulator.

14. The information-handling system according to claim 9, wherein the echo-canceling unit further comprises a plurality of vector modulators, at least one vector modulator comprising:
   the at least three phase shifters; and
   at least three weight calculation units, each weight calculation unit to generate a weight signal for the output signal of a corresponding phase shifter;
   wherein the first signal attenuator is to attenuate the output signal of each respective phase shifter based on the corresponding weight signal to form an echo-cancelation signal component corresponding to the phase shifter; and
   wherein the second signal combiner is to combine the respective echo-cancelation signal components into the received signal containing the echo signal to form the echo-canceled signal.

15. The information-handling system according to claim 14, wherein a first phase shifter of the at least three phase shifters of at least one vector modulator generates a nominal phase shift of 0° from the transmit signal with respect to the selected tap, a second phase shifter of the at least three phase shifters of the at least one vector modulator generates a nominal phase shift of 60° from the transmit signal with respect to the selected tap, and a third phase shifter of the at least three phase shifters of the at least one vector modulator generates a nominal phase shift of 120° from the transmit signal with respect to the selected tap.

16. The information-handling system according to claim 9, wherein each phase shifter is a variable-phase phase shifter, and
   wherein echo-canceling unit further comprises a weight calculation unit corresponding to each phase shifter to generate a variable-phase weight signal corresponding to the output signal of the phase shifter that varies a phase of the phase shifter.

17. The information-handling system according to claim 9, wherein the information-handling system comprises a cellular telephone, smartphone, smart-type device, or tablet-type device.

18. The information-handling system according to claim 17, wherein the cellular telephone, smartphone, smart-type device, or tablet-type device further comprises a touchscreen display capable of receiving input information from a touch of a user or a stylus.

* * * * *